US012587691B1

(12) United States Patent
Judd et al.

(10) Patent No.: US 12,587,691 B1
(45) Date of Patent: Mar. 24, 2026

(54) INFLIGHT ENTERTAINMENT SYSTEM PROVIDING SECURITY FOR MOBILE PERIPHERAL DEVICES ONBOARD AIRCRAFT

(71) Applicant: Thales Avionics, Inc., Irvine, CA (US)

(72) Inventors: Kevin Judd, Irvine, CA (US); Ton Do, Corona, CA (US); Michail Reznik, San Clemente, CA (US)

(73) Assignee: Thales Avionics, Inc., Irvine, CA (US)

( * ) Notice: Subject to any disclaimer, the term of this patent is extended or adjusted under 35 U.S.C. 154(b) by 0 days.

(21) Appl. No.: 18/999,108

(22) Filed: Dec. 23, 2024

(51) Int. Cl.
*H04N 21/214* (2011.01)
*H04N 21/414* (2011.01)
*H04N 21/61* (2011.01)

(52) U.S. Cl.
CPC ... *H04N 21/2146* (2013.01); *H04N 21/41422* (2013.01); *H04N 21/6131* (2013.01)

(58) Field of Classification Search
CPC ......... H04N 21/2146; H04N 21/41422; H04N 21/6131
See application file for complete search history.

(56) References Cited

U.S. PATENT DOCUMENTS

2015/0150061 A1* 5/2015 Bleacher .......... H04N 21/41422
2018/0247506 A1* 8/2018 Hong .................... G08B 13/22

* cited by examiner

*Primary Examiner* — Anthony Bantamoi
(74) *Attorney, Agent, or Firm* — Sage Patent Group

(57) ABSTRACT

A vehicle entertainment system includes a content server and a peripheral manager. The content server establishes communication connections through at least one communication network with mobile peripherals providing vehicle entertainment services to passengers, and routes entertainment content to the mobile peripherals. The peripheral manager responds to an indication of a loss of an established communication connection with one of mobile peripherals for at least a threshold time and during a vehicle arrival state, which are defined by a loss reporting rule and indicate the one of mobile peripherals is being transported offboard the vehicle, by sending information identifying the one of the mobile peripherals and/or a passenger associated with the one of the mobile peripherals to a crew terminal to notify a crew member and/or adding the information to a report that is communicated to an offboard peripheral manager located remote from the vehicle.

15 Claims, 3 Drawing Sheets

INFLIGHT ENTERTAINMENT SYSTEM PROVIDING SECURITY FOR MOBILE PERIPHERAL DEVICES ONBOARD AIRCRAFT

TECHNICAL FIELD

The present disclosure relates to inflight entertainment systems and their operation with various types of mobile electronic devices that can be used by passengers during flights.

BACKGROUND

The current airline industry trend is to look for additional ways for airlines to provide more advanced types of mobile electronic devices which can be coupled to an onboard inflight entertainment (IFE) system to provide advanced functionality for passengers during flights. Such mobile electronic devices are also referred to herein as "mobile peripherals" which are configured to operationally interact with the IFE system to provide entertainment services for passengers. Example types of mobile peripherals can include, without limitation, passenger control units (PCUs) for controlling seat video display units (SVDUs), augmented reality devices and/or virtual reality devices (e.g., AR/VR headsets), noise cancelling headphones, gaming consoles, tablet computers, smart watches, etc.

One goal of providing such mobile peripherals is to provide passengers with an expanded variety and more advanced multi-media experiences which leverage emerging technologies by the mobile electronic device industry.

Airlines have implemented security for mobile peripherals through two approaches. Some peripherals, e.g., wireless PCUs, have been connected to the seat structures through wired tethers so they have a limited range of movement and prevent passenger removal from the aircraft. Other peripherals, e.g., wireless headphones, are designed to communicatively connect to SVDUs through detachable wired cables having custom connectors which are incompatible beyond use with the airline's equipment and which make the peripheral non-usable to passengers if transported offboard the aircraft.

There are several issues with these security approaches. Both incur significant cost increases as they are using non-standard peripherals which are specifically configured for use onboard aircraft. In the case where the peripheral is configured to be permanently attached to the aircraft, e.g., seat structure, the peripheral design may require additional work related to aircraft qualification assessment and certification.

SUMMARY

The following disclosure describes vehicle entertainment systems that include peripheral managers that manage security of mobile peripherals which can be used by passengers during travel onboard a vehicle and which may or may not be allowed to be removed from the vehicle by passengers. When a mobile peripheral is determined to have been removed, the peripheral manager can inform an offboard peripheral manager to, for example, initiate charging of the passenger for continued temporary use and/or ownership of the mobile peripheral.

Some embodiments are directed to a vehicle entertainment system that includes a content server and a peripheral manager onboard the vehicle. The content server is operative to establish communication connections through at least one communication network with mobile peripherals providing vehicle entertainment services to passengers, and to route entertainment content through the communication connections to the peripherals responsive to commands received from the peripherals.

The peripheral manager is communicatively connected to the content server, and operative to respond to an indication of a loss of an established communication connection with one of mobile peripherals for at least a threshold time and during a vehicle arrival state, which are defined by a loss reporting rule and indicate the one of mobile peripherals is being transported offboard the vehicle, by sending information identifying the mobile peripheral and/or a passenger associated with the mobile peripheral to a crew terminal to notify a crew member, and/or by adding the information to a report that is communicated through a communication modem and an off-vehicle communication link to an offboard peripheral manager located remote from the vehicle.

Other vehicle entertainment systems and corresponding methods and computer program products according to embodiments of the invention will be or become apparent to one with skill in the art upon review of the following drawings and detailed description. It is intended that all such additional systems, methods, and computer program products be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

DETAILED DESCRIPTION

Figure 1:
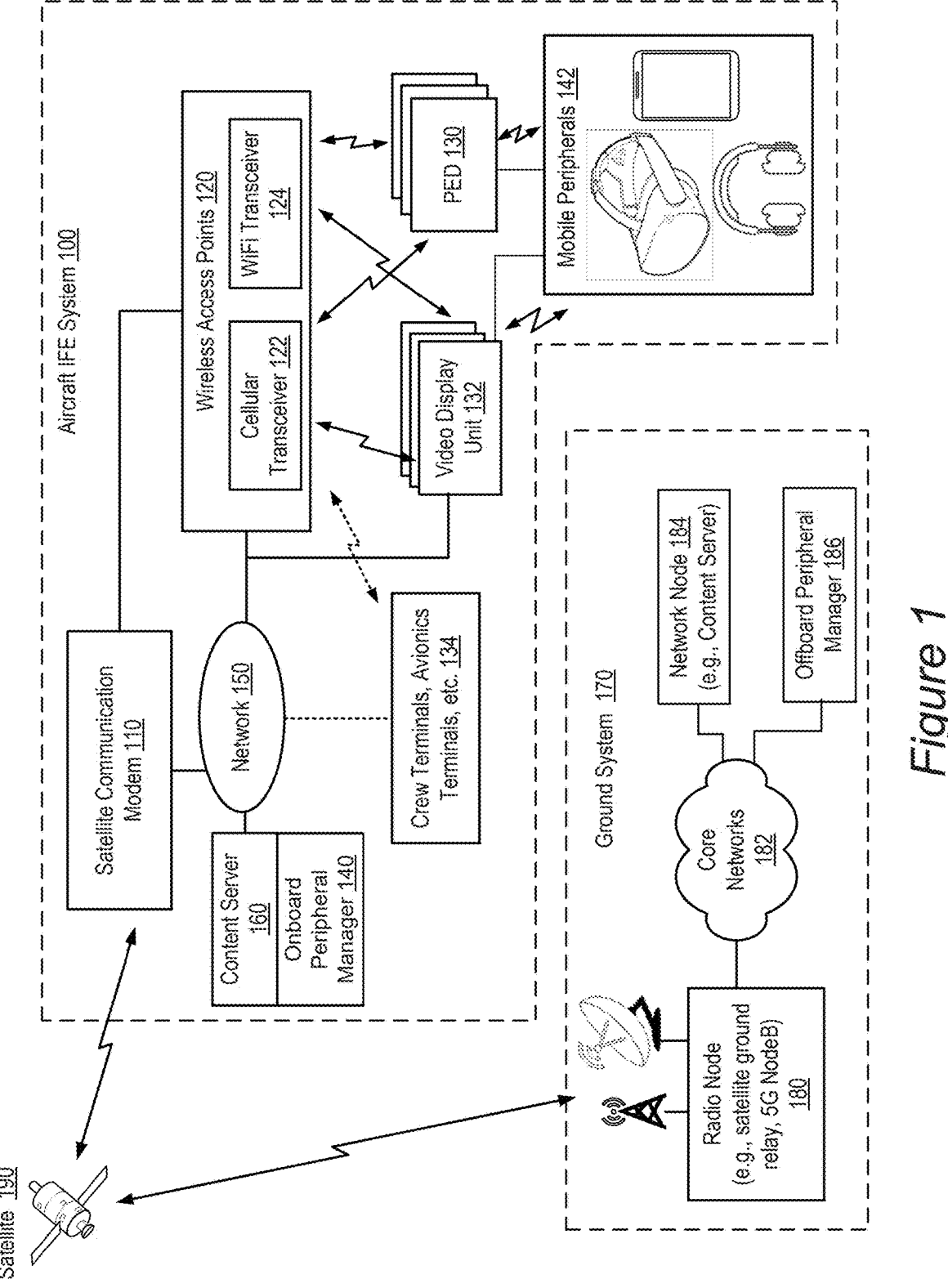
FIG. 1 illustrates a component block diagram of an aircraft IFE system with mobile peripherals and an onboard peripheral manager, a satellite communication network, and a ground system with an offboard peripheral manager, which are configured to operate in accordance with various embodiments of the present disclosure.

In the following detailed description, numerous specific details are set forth in order to provide a thorough understanding of example aspects of the present invention. However, it will be understood by those skilled in the art that the present invention may be practiced without these specific details. In other instances, well-known methods, procedures, components and circuits have not been described in detail so as not to obscure the present invention.

As explained above, there is a need to provide passengers with access to more advanced types of peripherals which can be coupled to an onboard IFE system to operationally provide advanced entertainment functionality for passengers during flights. There is then a related need to provide security for these peripherals to prevent or minimize any unexpected loss from inventory of the airline. Improved approaches are needed for securing peripherals without necessitating use of wired tethers to secure peripherals to seat structures and/or without necessitating costly modification of the peripherals to use custom connectors which render the peripherals non-usable to passengers if transported offboard the aircraft.

Embodiments of the present disclosure are directed to addressing these and other needs.

Through the use of operational embodiments herein, airlines can provide passengers with access to a myriad of different types of mobile peripherals. The mobile peripherals can include, without limitation, passenger control units (PCUs) operative to control SVDUs, augmented reality devices and/or virtual reality devices (e.g., AR/VR headsets also referred to as extended reality (XR) headsets), noise cancelling headphones, gaming consoles, tablet computers, smart watches, health monitoring devices, etc.

Airlines may provide the mobile peripherals to passengers for temporary use during a flight, for use throughout a multi-flight trip including airport layover(s) (e.g., passenger transports the mobile peripheral from one flight to the next), and/or during a round-trip including roundtrip destinations and/or multi-city destinations (e.g., passenger keeps the mobile peripheral for the trip duration and returns upon arrival at the home airport). Moreover, airlines can loan mobile peripherals to passengers to temporarily try-out during a flight and/or trip with the option to buy ownership during or after the trip. Airlines can thereby improve passenger travel experiences and create new ways of monetizing those experiences. The mobile peripherals may, for example, be provided for use free of charge or reduced charge for premium-class ticketed airline travel and/or to reward airline loyalty status members. Purchasing of the mobile peripherals can be automated to provide a passenger the option of keeping a loaned peripheral after traveling.

As will be described in further detail below, operational embodiments enable airlines to securely track location of peripherals in an airline environment and facilitate payment by passengers according to defined rules.

Before discussing the example operations for providing security for peripherals in an aircraft environment, an overview is provided of example components of aircraft and ground communication systems that can be used in accordance with some embodiment of the present disclosure.

FIG. 1 illustrates a component block diagram of an aircraft IFE system 100 with mobile peripherals 142 and an onboard peripheral manager 140, a satellite communication network 190, and a ground system 170 with an offboard peripheral manager 186, which are configured to operate in accordance with various embodiments of the present disclosure.

Although embodiments herein are primarily described in the context of in-flight entertainment solutions for an aircraft, the invention is not limited thereto. Instead, these and other related embodiments may be used with other types of vehicles, including, without limitation, ships (e.g., cruise ships), trains, subways, and buses. Accordingly, although various embodiments are described in the example context of involving passengers and crew, these and other embodiments can more generally be used by any persons ("users").

Accordingly, the terms passenger and user are used interchangeably without limitation.

Referring to FIG. 1, the IFE system 100 communicates with the ground system 170 using various communication technologies, e.g., proprietary satellite protocols, 3GPP 5G protocols, etc. More particularly, the example IFE system 100 includes a satellite communication modem 110 that transmits and receives signaling through one or more satellite antennas which is relayed by satellite(s) 190 to and from a ground-based radio node 180 (e.g., satellite gateway and relay, 5G NodeB, etc.).

In the IFE system 100, content received by the satellite communication modem 110 through satellite aperture antenna(s) are transported via RF link or Common Public Radio Interface (CPRI) interface (e.g., Ethernet or fiber optic links) and one or more networks 150 to an content server 160 (also IFE controller) for possible distribution through the network(s) 150 and/or wireless access points 120 to SVDUs 132, passenger electronic devices (PEDs) 130, mobile peripherals 142, crew terminals 134, and other avionics terminals. The wireless access points 120 can include WiFi transceivers 124 (e.g., IEEE 802.11) or cellular transceivers 122.

The content server 160 can communicate with ground-based network nodes 184, e.g., content servers (e.g., over-the-top servers providing content such as movies, TV programming, games, e-books, Internet webpages, etc.), through core networks 182 (e.g., private networks and/or public networks such as the Internet) and the radio node 180, etc. The content server 160 can provide content from the network nodes 184 to the SVDUs 132, PEDs 130, and mobile peripherals 142, and may alternatively or additionally provide similar types of content that has been previously loaded into onboard memory.

In accordance with present embodiments, the content server 160 can be configured to communicate with various types of mobile peripherals 140 to provide operational functionality to passengers. For example, the content server 160 can operate to stream movies and other content to VR/AR headsets, tablet computers, etc. for display and audio playout to passengers through noise cancelling headphones. Similarly, the content server 160 may download executable applications (e.g., games) to XR headsets, gaming consoles, tablet computers, etc. for playing by passengers. The content server 160 may communicate with smart watches worn by passengers to track and monitor health data, provide navigation information to a smart watch which the passenger can follow to navigate from an arrival gate to a departure gate at an airport, etc.

Passengers can thereby be provided unique experiences which may include playing aircraft themed games through VR/AR headsets that may adapt the gameplay based on the aircraft configuration (e.g., type of aircraft and seating location of passenger), present flight location, view outside the aircraft of the surrounding airspace, ground and/or space, etc.

The onboard peripheral manager 140 operates to implement peripheral security measures which may track location and movement of peripherals in the cabin and generate alert notifications to passengers, crew, and the offboard peripheral managers 186 when one or more notification rule(s) are satisfied. Although the onboard peripheral manager 140 is illustrated as a discrete box in FIG. 1 for ease of illustration and description, its functionality may be at least partially integrated within the content server 160, the seat display units 132, and/or one or more other electronic components of the IFE system 100.

The onboard peripheral manager 140 may operate to monitor establishment and maintenance of communication connections with peripherals 142, authorize use of IFE resources (e.g., movies, gaming, Internet access, etc.), and billing related activities related to such use.

For example, the peripheral manager 140 (or a component thereof in the content server 160, SVDUs 132 and/or wireless access points 120) can manage setup and maintenance of Bluetooth, WiFi, or other wireless communication connections and/or wired communication (e.g., USB wired interfaces of SVDUs 132) with mobile peripherals 142.

The content server 160 can operate to establish communication connections through at least one communication network (e.g., network 150, WAPs 120, SVDUs 132, etc.) with the mobile peripherals 142 to provide vehicle entertainment services to passengers, and to route entertainment content through the communication connections to the mobile peripherals 142 responsive to commands received from the mobile peripherals 142.

The onboard peripheral manager 140 may determine based on an identifier of a mobile peripheral 142 and/or based on passenger information associated with the mobile peripheral 142 whether the mobile peripheral 142 is allowed to be communicatively connected to components of the IFE system (e.g., to the content server 160). If allowed, the operations determine what IFE services and resources the mobile peripheral 142 is allowed to access (e.g., downloading executable gaming applications, streaming movies, accessing flight and/or airport terminal information, accessing airline reservation and other information, streaming audio, etc.) and at what costs. The peripheral manager 140 may communicate through the satellite communication modem 110 with the offboard peripheral manager 186 to make such authorization decisions and/or to coordinate monetary charging of a passenger's account.

The peripheral manager 140 can operate to implement security procedures for the mobile peripherals 142.

The mobile peripherals 142 may be specifically adapted (e.g., include embedded security module or application) to operate in communication with the peripheral manage 140 to help implement security procedures. A mobile peripheral 142 may perform an authentication process with the peripheral manager 140 before being granted access to certain resources and/or services of the IFE system 100. For example, the peripheral manager 140 may confirm that a passenger identifier has been assigned to the mobile peripheral 142 and is authorized to temporarily use or purchase the mobile peripheral 142 for use during the flight with the IFE system 100.

The mobile peripheral 142 may communicate with the content server 160 via, for example, a Bluetooth and/or WiFi connection through a RF transceiver of the SVDU 132 and/or through a wired network interface (e.g., USB-C interface) of the SVDU 132. The implementation could also be set up so that the device could receive its unlock status via communication with other Thales IFE hardware such as cabin wide WAPS or individual SVDUs and/or or connectivity servers so that a cabin wide implementation could be performed with lower latency or load on the network 150 and content server 160.

The peripheral manager 140 can operate to respond to an indicated loss of an established communication connection with one of mobile peripherals 142 for at least a threshold time and during a vehicle arrival state, which are defined by a loss reporting rule and indicate the one of mobile peripherals 142 is being transported offboard the vehicle, by sending information identifying the one of the mobile peripherals 142 and/or a passenger associated with the one of the mobile peripherals 142 to the crew terminal 134 to notify a crew member and/or by adding the information to a report that is communicated through the communication modem 110 and an off-vehicle communication link to the offboard peripheral manager 186 (located remote from the vehicle).

In one operational embodiment, the mobile peripheral 142 may be configured to respond to loss of an established connection with a SVDU 132, WAP 120, and/or content server 160 (indicating removal from the aircraft) by triggering a countdown timer. Before expiration of the countdown timer, the mobile peripheral 142 can continue to be used by the passenger in an unlocked state. In one approach, responsive to expiration of the countdown timer the mobile peripheral 142 enters a locked state which prevents the passenger from accessing certain operational functionality and which may trigger instructions to be displayed or otherwise provided to the passenger indicating how to return the mobile peripheral 142 to the airline and/or how to complete purchase of the mobile peripheral 142. Alternatively, responsive to expiration of the countdown timer the offboard peripheral manager 186 may initiate the passenger's payment for the mobile peripheral 142 and, if successful, enable the mobile peripheral 142 to remain in an unlocked state providing full operational functionality access for the user.

While on board the aircraft, a mobile peripheral 142 may exchange heartbeat messages with the onboard peripheral manager 140, with each heartbeat message received by the mobile peripheral 142 triggering a controller of the mobile peripheral 142 to reset the countdown timer to a defined threshold value (i.e., reset the timer duration). In this manner, absence of a heartbeat message being received causes the countdown timer to expire and triggers the mobile peripheral 142 to enter the locked state and/or trigger instructions to be displayed or otherwise provided to the passenger indicating how to return the mobile peripheral 142 to the airline and/or how to complete purchase of the mobile peripheral 142.

Other operations can allow the mobile peripheral 142 to remain unlocked for use by a passenger across multiple legs of a trip. For example, the threshold duration to which the countdown timer is set may be determined based on the expected duration of use of the mobile peripheral 142 by a particular passenger during a trip. For example, a passenger who is authorized to use a mobile peripheral 142 during a single flight can have the peripheral's countdown timer set to a first threshold duration which can be sufficiently brief to promptly Block the peripheral 142 if carried offboard aircraft.

In contrast, another passenger who is authorized to use a mobile peripheral 142 during a trip having multiple flights with intervening layover(s) can have the peripheral's countdown timer set to a second threshold duration which can be sufficiently long to not lock the peripheral 142 during an expected travel duration of the trip.

The threshold duration for the countdown timer may be determined based on an itinerary obtained for the passenger to cover a portion of a trip or the entire trip. The threshold duration for the countdown timer may be determined based on a passenger's loyalty status, e.g., giving longer duration of continued peripheral usage offboard the aircraft and/or discounts for renting and/or purchasing the peripheral. A passenger may be provided discounts for shopping purchases performed using the peripheral during the trip.

As explained above, an airline may enable the passenger to rent a mobile peripheral 142 for use during a trip and which may provide the passenger with the ability to purchase the mobile peripheral 142 for continued use after the trip. Such rental and/or purchase service can be provided as an added feature so the passenger can use the airline rented peripheral during all legs of the trip and at the destination of the trip. The passenger thereby enjoys a new type of peripheral experience or obtains access to a peripheral that the passenger has at home but without the inconvenience of bringing their own peripheral onboard.

While the mobile peripheral 142 is onboard and connected to the IFE system 100, the MAC address of the mobile peripheral 142 may be used to allow onboard purchases. The MAC address may also be used at home to allow confirmation of purchase(s) through the mobile peripheral 142 and may continue to be used to allow purchases through an account associated with airline in the future.

Moreover, while the mobile peripheral 142 is onboard and connected to the IFE system 100, the passenger may be provided an opt-in permissions page (e.g., displayed through the peripheral) so that the passenger can agree to the terms of use, and provide a credit card number or other payment instructions so if the mobile peripheral 142 is removed an automatic billing could be performed.

Figure 2:
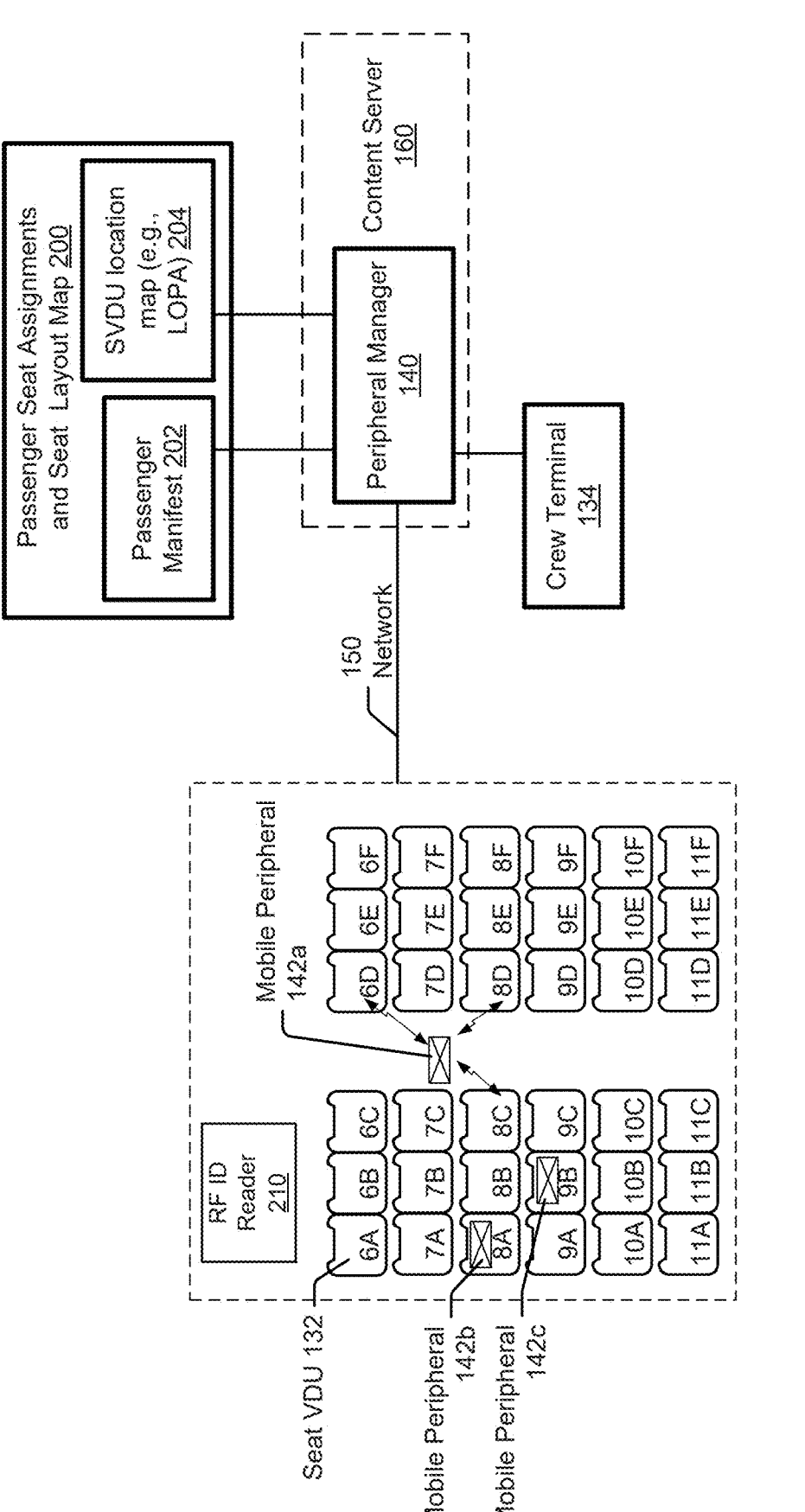
FIG. 2 illustrates in further details a component block diagram of the aircraft IFE system with the onboard peripheral manager, content server, crew terminal, and RF transceivers located at seat video display units and near a vehicle exit which track location of mobile peripherals, in accordance with various embodiments of the present disclosure.

FIG. 2 illustrates in further details a component block diagram of the aircraft IFE system 100 with the onboard peripheral manager 140, content server 160, crew terminal 134, and RF transceivers located at seat video display units 132 and near a vehicle exit which track location of mobile peripherals 142, in accordance with various embodiments of the present disclosure.

Referring to FIG. 2, an arrangement of SVDUs 132 is illustrated along passenger seating rows, e.g., 6A-6F, 7A-7F, . . . 11A-11F with an ingress/egress aisle between groups of seating columns. Two mobile peripheral 142b and 142c are operated by passengers while seated. In contrast, another mobile peripheral 142a is being transported by passenger along the aisle toward a cabin exit.

In accordance with some embodiments, the peripheral manager 140 can receive reports provided by each of the SVDUs 132 (by a local controller in each SVDU) indicating signal strength measurements and/or estimated ranges between radiofrequency (RF) transceivers in each of the SVDUs 132 and the mobile peripherals 142a-c. The RF transceivers are operative to establish a communication connection with one or more of the mobile peripherals 142, e.g., through a pairing process. For example, passenger may perform a pairing process that establishes a communication connection between the passenger's peripheral and one of the SVDUs 142 providing entertainment services to the assigned seat of the passenger. The SVDUs 142 include a local controller that provides operational functionality as explained herein. The peripheral manager 140 may triangulate a location of the mobile peripherals 142a-c within the cabin based on the reported information.

In one illustrative embodiment, the mobile peripheral 142a was originally paired with the SVDU 132 at seat 9D to establish a communication connection with the content server 160 and provide entertainment services to the passenger. The local controller of SVDU 142 at seat 9D can operate to identifies loss of the established communication connection between the RF transceiver and the mobile peripheral 142a for at least the threshold time and during a vehicle arrival state defined by a loss reporting rule, and responsive to the identification communicates a message containing the indication to the peripheral manager 140 to trigger the sending of the information to the crew terminal

134 and/or the adding of the information to the report for communication to the offboard peripheral manager 186.

The vehicle arrival state can be defined as corresponding to while the aircraft is on the ground and, e.g., a state in which the passengers are permitted to egress from the aircraft. In one embodiment, the peripheral manager 140 determines that the aircraft has transitioned to the vehicle arrival state responsive to receiving a message through the network 150 indicating that the aircraft has landed and/or indicating that an aircraft cabin exit door has been opened. The peripheral manager 140 may inform the SVDUs 132 when the aircraft is in the vehicle arrival state in which they share the SVDUs 132 to monitor for activity that is indicative of a mobile peripheral 142 being transported toward the aircraft exit and/or offboard aircraft.

Some embodiments are directed to operations which respond to the determination that the mobile peripheral 142a is being transported toward the aircraft exit or offboard, by sending a notification to the mobile peripheral 142a with instructions for the passenger to return the mobile peripheral 142a to a crew member and/or to a defined location within the vehicle and/or at a passenger entrance area of an arrival terminal. More specifically, the peripheral manager 140 may operate to respond to the identification, by identifying a SVDU (e.g., SVDU 132 at seat 6D) with a RF transceiver that is able to temporarily establish a communication connection between the RF transceiver of the SVDU and the mobile peripheral 142a, and communicating to the SVDU for relay to the first mobile peripheral another message containing instructions for a passenger to return the mobile peripheral 142a to a crew member, to a defined location within the vehicle, and/or to a defined location along a passenger ingress pathway of an arrival terminal.

The peripheral manager 140 may operate to respond to the identification by triggering a strobing light, a sound generation device, and/or a vibrator device of the mobile peripheral 142a to warn a crew member and the passenger. More specifically, the peripheral manager 140 may operate to respond to the identification, by identifying a SVDU (e.g., SVDU 132 at seat 6D) with a RF transceiver that is able to temporarily establish a communication connection between the RF transceiver of the SVDU and the mobile peripheral 142a, and to communicate to the SVDU for relay to the mobile peripheral 142a another message containing a command to trigger a light device in the mobile peripheral 142a to emit a strobing light pattern which can be seen by a passenger transporting the mobile peripheral 142a and/or by a crew member, to trigger a sound generation device in the mobile peripheral 142a to generate an alert sound pattern that can be heard by the passenger transporting the mobile peripheral 142a and/or by a crew member, and/or to trigger a vibrator device in the mobile peripheral 142a to generate an alert vibration which can be felt by the passenger transporting the mobile peripheral 142a.

Some further embodiments are directed to decreasing communication range of the RF transceivers in the SVDUs 132 responsive to the vehicle transitioning from a vehicle travel state (e.g., during flight) to a vehicle arrival state (e.g., upon landing, when exit door is opened, etc.) defined by the loss reporting rule, in order to more quickly detect when a mobile peripheral is being moved from a seating area.

According to one embodiment, for each of the SVDUs 132, the local controller operates to reduce transmission power of the RF transceiver responsive to the vehicle transitioning from a vehicle travel state to a vehicle arrival state defined by the loss reporting rule, to decrease a maximum distance that one of the mobile peripherals 142 can be moved away from the RF transceiver without loss of the established communication connection.

According to a further embodiment thereof, for each of the SVDUs 132, the local controller is operative to limit transmission power level of the RF transceiver to more than a first threshold level while the vehicle is in the vehicle travel state, and to limit transmission power level of the RF transceiver to no more than a second threshold level while the vehicle is in the vehicle arrival state, wherein the first threshold level is greater than the second threshold level.

The first threshold level can be set at least twice as great as the second threshold level, which can substantially decrease the range of a Bluetooth or WiFi transceiver while enabling continued connection with a mobile peripheral 142 while also decreasing a maximum distance that mobile peripheral 142 can be moved away from the RF transceiver without loss of the established communication connection and triggering of one of the security processes herein. The substantial difference between first and second threshold levels can be possible onboard an aircraft because the mobile peripheral 142 is normally used by a passenger while seated directly in front of the SVDU 132 serving the passenger's seat and while remaining within typically no more than about 8 feet of the SVDU 132 while being operated in a premium class seating configuration or no more than about 5 feet of the SVDU 132 while being operated in an economy class seating configuration.

According to a further embodiment thereof, for each of the SVDUs 132, the local controller is operative to determine the first threshold level based on a maximum transmission power level capability of the RF transceiver, which may be defined during configuration of a SVDU 132 for operation. The local controller can operate to determine the second threshold level based on measuring a minimum transmission power level of the RF transceiver that allows maintaining an established communication connection with a mobile peripheral while remaining located in a seating area serviced by the SVDU, and determining the second threshold level based on a combination of the minimum transmission power level and a defined offset value.

The IFE system 100 may include a Radio Frequency IDentification (RF ID) reader device 210 mounted at a location in the cabin along a passenger egress pathway toward a cabin exit door, e.g., mounted near the cabin exit door, to identify when a mobile peripheral 142 with a RF ID tag is being carried offboard. The RF ID reader device 210 may generate a relatively high level of broadband RF noise during operation, which can be unacceptable for aircraft operation except while passengers are deboarding. Therefore, in one embodiment the peripheral manager 140 is further operative, responsive to determining the vehicle has transitioned to the vehicle arrival state, to activate (e.g., power-on) the RF ID reader device 210 to operate to read RF ID tags.

The peripheral manager 140 monitors the RF ID reader device 210 to read data provided by a RF ID tag on the one of the mobile peripherals 142 (e.g., peripheral 142a) as it passes within range of the RF ID reader device 210. The peripheral manager 140 determines based on the data the information identifying the one of the mobile peripherals 142 and/or the passenger associated with the one of the mobile peripherals, for sending to the crew terminal 134 and/or adding to the report for communication to the off-board peripheral manager 186.

Some further embodiments are directed to tracking movement of a mobile peripheral 142 toward a vehicle cabin exit door, and responsively triggering the sending of the information to the crew terminal 134 and/or the adding of the information to the report for sending to the board peripheral manager 186.

In some example embodiments, the peripheral manager 140 is operative to receive reports from the local controllers of the SVDUs 132 indicating a list of mobile peripherals that are within communication range. The peripheral manager 140 tracks location of the mobile peripheral 142a based on which of the SVDUs 132 are reporting that the mobile peripheral 142a is within communication range and based on which of the SVDUs 132 are not reporting that the first mobile peripheral is within communication range. The peripheral manager 140 may also track location mobile peripheral 142 and based on use of a cabin layout of passenger accommodations (LOPA) 204 indicating locations of the SVDUs relative to each other and possibly also relative to the cabin exit. The peripheral manager 140 operates to trigger the sending of the information to the crew terminal 134 and/or the adding of the information to the report responsive to the mobile peripheral 142a traveling within a threshold distance of the cabin exit during the vehicle arrival state.

The peripheral manager 140 may operate to send display commands to the crew terminal 134 to dynamically update a graphical representation of the LOPA and the vehicle cabin exit with a graphical indication of the tracked location of the mobile peripheral 142 in the vehicle.

Figure 3:
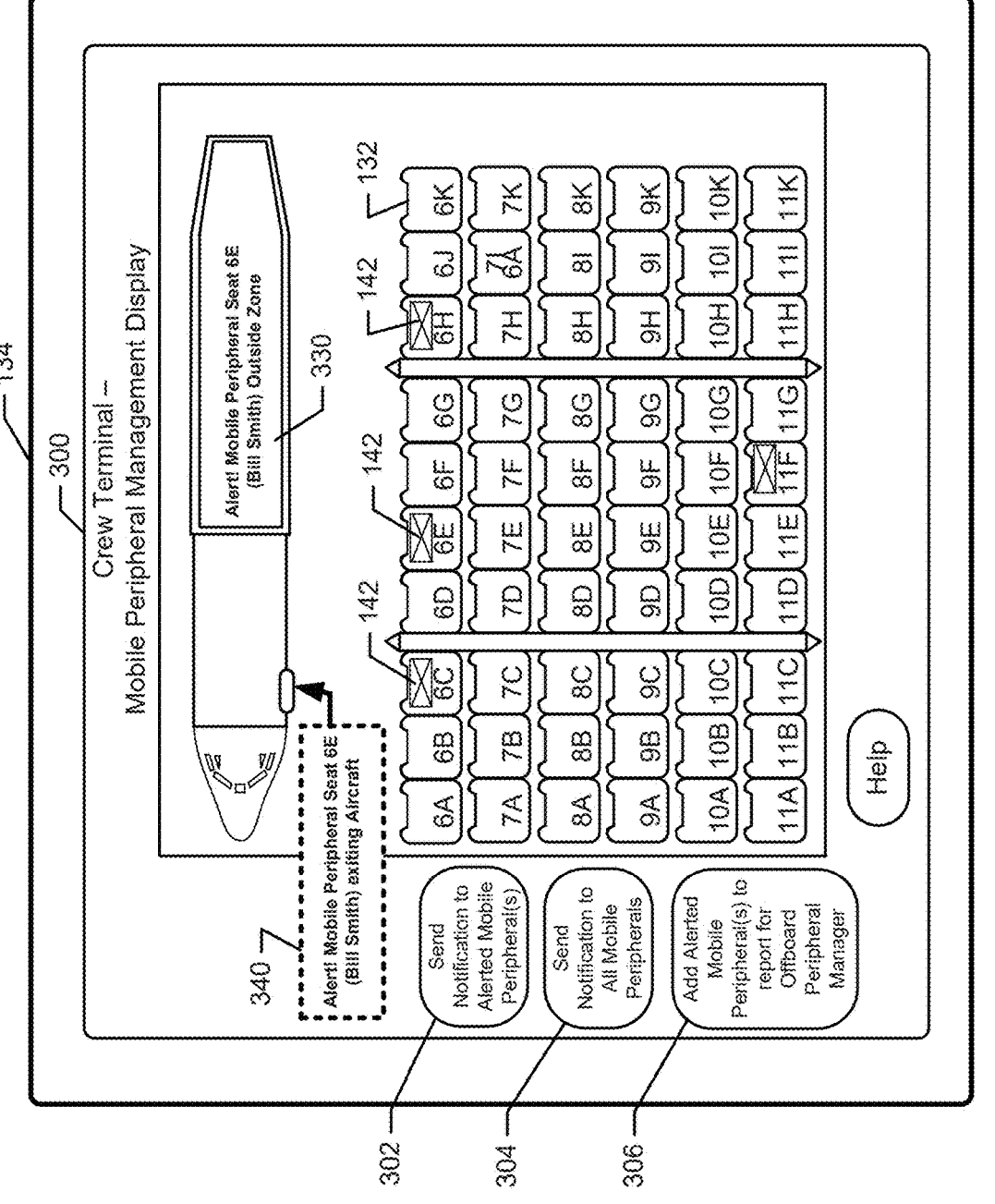
FIG. 3 illustrates an example mobile terminal management display layout that can be generated on a crew terminal to enable crew to secure mobile peripherals in accordance with various embodiments of the present disclosure.

FIG. 3 illustrates an example mobile terminal management display layout 300 that can be generated on the crew terminal 134 to enable a crew member to monitor and secure the mobile peripherals 142 in accordance with various embodiments of the present disclosure. The illustrated display layout 300 provides a graphical representation of the LOPA and the vehicle cabin exit.

Referring to FIGS. 2 and 3, the display layout 300 can visually inform a crew member where mobile peripherals 142 are located relative to the graphical representation of the LOPA and the vehicle cabin exit. The display layout 300 may provide notifications when a mobile peripheral 142 has become disconnected from a SVDU 132, disconnected from the content server 160, has moved outside a defined zone where the particular SVDU 132 is assigned (expected) to operate, has moved within a threshold distance of the cabin exit door, has moved through the cabin exit door, etc.

In some embodiments, the peripheral manager 140 sends display commands to the crew terminal 134 to dynamically update the display layout 300 with a graphical indication of the tracked locations of the mobile peripheral 142 relative to the LOPA and the vehicle cabin exit.

The peripheral manager 140 may identify the passenger associated with one of the mobile peripherals 142 based on querying a passenger manifest 202 containing a list of passengers onboard the vehicle and mobile peripherals 142 assigned to the listed passengers. The peripheral manager 140 may add to the passenger manifest 202 the information identifying which of the mobile peripherals 142 are assigned to which of the listed passengers, which may be determined by monitoring which mobile peripherals 142 are connected to which SVDUs 132 and knowing (via the LOPA 204) which passenger are assigned to which seats that are served by which of the SVDUs 132.

The peripheral manager 140 may respond to determining that the mobile peripheral 142a has traveled at least a threshold distance along the passenger egress pathway toward the cabin exit during the vehicle arrival state without having reached the threshold distance of the cabin exit, by sending a first level of alert notification to the crew terminal 134 for display as part of the display layout 300. In contrast, the mobile peripheral 142a may respond to determining that the mobile peripheral 142a has traveled to less than the threshold distance from the vehicle cabin exit, by sending a second level of alert notification to the crew terminal 134 for display to indicate a higher level of urgency than indicated by the first level of alert for stopping removal of the mobile peripheral 142a by the passenger.

As shown in FIG. 3, the first level of alert notification can correspond to the displayed alert 330 "Mobile Peripheral Seat 6E (Bill Smith) Outside Zone", which informs a crew member that the mobile peripheral 142a which should be kept at seat 6E has been moved by a passenger named "Bill Smith" outside a cabin zone where that peripheral is expected to be maintained. The second level of alert notification can correspond to the displayed alert 340 "Mobile Peripheral Seat 6E (Bill Smith) Exiting Aircraft", which informs a crew member that passenger "Bill Smith" is carrying that the mobile peripheral 142a in the exit area or through the cabin door.

Identifying the passenger's name to the crew member can be particularly advantageous for enabling the crew member to identify a particular person who is carrying the mobile peripheral 142a (perhaps concealed in a coat, bag, etc.) from among a crowd of passengers who are disembarking an aircraft. Accordingly, a passenger manifest 202, which identifies passenger names and assigned seat locations can advantageously be used by the peripheral manager 140.

The crew terminal 134 can display user selectable indicia (e.g., soft-buttons) which a crew member can touch-select to trigger defined actions. In the example of FIG. 3, a crew member can select indicia 302 to send a notification to one or more more of the mobile peripherals 142 which satisfies a notification rule, e.g., has moved outside its assigned zone, has a tracked movement pathway leading toward the cabin exit door, has moved within a threshold distance of the cabin exit door, has moved through the cabin exit door, etc.

The notification that is sent to the mobile peripheral 142 may contain information informing the passenger where onboard to store the mobile peripheral 142 and/or informing to handover the mobile peripheral 142 to a crew member. The notification may contain a command to trigger a light device in the mobile peripheral 142 to emit a strobing light pattern which can be seen by the crew member and the passenger, to trigger a sound generation device in the mobile peripheral 142 to generate an alert sound pattern that can be heard by the crew member and the passenger, and/or to trigger a vibrator device in the mobile peripheral 142 to generate an alert vibration which can be felt by the passenger transporting the first mobile peripheral.

The crew member can select another indicia 304 to send a notification to all mobile peripherals 142, e.g., to instruct passengers where the mobile peripherals 142 should be stored before leaving the cabin, instruct passengers how to obtain entertainment service through the IFE system 100, instruct passengers how to complete payment for temporary use or to purchase the mobile peripherals 142, etc.

The crew member can select another indicia 306 to add information identifying the mobile peripheral(s) 142 which satisfy the notification rule, e.g., have been transported offboard the aircraft, to the report for communication to the offboard peripheral manager 186.

In some embodiments, a mobile peripheral 142 is connected through a communication cable to a wired communication interface, e.g., USB-C, on a SVDU 132. The onboard peripheral manger 140 can identify, e.g., via a message received from the controller of a SVDU 132, when a wired connection to a mobile peripheral 142 has become disconnected (e.g., unplugged), determine whether a notification rule is satisfied. Responsive to the notification rule being satisfied, operations trigger notification of a crew member, e.g., via a notification displayed on the crew terminal 134 and/or notification to the passenger, e.g., via the seat display unit 132 serving the passenger's seats and/or through the mobile peripheral 142 itself. As explained above, the notification may provide instructions to the passenger for how the peripheral 142 can be returned to the airline crew, securely stowed in the seat area, dropped off in a receptacle located near the aircraft exit, along the arrival gate bridge, at the arrival gate, etc. Alternatively or additionally, when the notification rule is satisfied the operations may trigger an audible alert (e.g., siren and/or computer generated speech warning), light alert (strobing light), and/or vibrational alert through an associated device (e.g., speaker, light(s), and/or vibrator device) of the peripheral 142.

In another embodiment, the operations identify when a wireless connection to a peripheral 142 has become disconnected, e.g., Bluetooth connection terminated or WiFi connection terminated, and as described above can determine whether the notification rule is satisfied and, if so, responsively trigger notification to the crew and/or the passenger.

Responsive to determining that a mobile peripheral 142 has become disconnected from a wired connection (unplugged), the onboard peripheral manager 140 may trigger establishment of a WiFi and/or Bluetooth connection with that mobile peripheral 142 to enable tracking and/or sending of a notification to that mobile peripheral 142.

In one illustrative embodiment, the local controller of a SVDU 132 identifies disconnection of a wired network cable connection to a mobile peripheral 142 during the vehicle arrival state. Responsive to that determination, the local controller may activate a RF transceiver (e.g., Bluetooth, WiFi, etc.) to attempt to establish a communication connection with that mobile peripheral 142. The local controller may notify the peripheral manager 140 which can responsively trigger, e.g., via the content server 160, the wireless access points 120 to attempt to establish a communication connection with that mobile peripheral 142, and/or trigger other SVDUs 132 (RF transceivers therein) to attempt to establish a communication connection with that mobile peripheral 142.

Further Definitions and Embodiments

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the following examples of embodiments and their equivalents, and shall not be restricted or limited by the foregoing detailed description.

What is claimed is:

1. A vehicle entertainment system comprising:
a content server operative
    to establish communication connections through at least one communication network with mobile peripherals providing vehicle entertainment services to passengers, and
    to route entertainment content through the communication connections to the mobile peripherals responsive to commands received from the mobile peripherals; and
a peripheral manager onboard the vehicle and operative to respond to an indication of a loss of an established communication connection with one of mobile peripherals for at least a threshold time and during a vehicle arrival state, which are defined by a loss reporting rule and indicate the one of mobile peripherals is being transported offboard the vehicle, by sending information identifying the one of the mobile peripherals and/or a passenger associated with the one of the mobile peripherals to a crew terminal to notify a crew member and/or adding the information to a report that is communicated through a communication modem and an off-vehicle communication link to an offboard peripheral manager located remote from the vehicle.

2. The vehicle entertainment system of claim 1, wherein: the peripheral manager is further operative to identify the passenger associated with the one of the mobile peripherals based on querying a passenger manifest containing a list of passengers onboard the vehicle and mobile peripherals assigned to the listed passengers.

3. The vehicle entertainment system of claim 1, further comprising:

a plurality of seat video display units (SVDUs) mounted to passenger seats, each of the SVDUs comprising a local controller and a radio frequency (RF) transceiver operative to establish a communication connection with one of the mobile peripherals, wherein the local controller of a first SVDU identifies loss of an established communication connection between the RF transceiver and a first mobile peripheral for at least the threshold time and during the vehicle arrival state defined by a loss reporting rule, and responsive to the identification communicates a message containing the indication to the peripheral manager to trigger the sending of the information to the crew terminal and/or the adding of the information to the report.

4. The vehicle entertainment system of claim 3, wherein:

the vehicle comprises an aircraft;

the peripheral manager determines the aircraft has transitioned to the vehicle arrival state responsive to receiving a message through the at least one communication network indicating that the aircraft has landed and/or indicating that an aircraft cabin exit door has been opened.

5. The vehicle entertainment system of claim 3, wherein the peripheral manager is further operative to:

responsive to the identification, identify a second SVDU with a RF transceiver that is able to temporarily establish a communication connection between the RF transceiver of the second SVDU and the first mobile peripheral, and to communicate to the second SVDU for relay to the first mobile peripheral another message containing instructions for a passenger to return the first mobile peripheral to a crew member, to a defined location within the vehicle, and/or to a defined location along a passenger ingress pathway of an arrival terminal.

6. The vehicle entertainment system of claim 3, wherein the peripheral manager is further operative to:

responsive to the identification, identify a second SVDU with a RF transceiver that is able to temporarily establish a communication connection between the RF transceiver of the second SVDU and the first mobile peripheral, and to communicate to the second SVDU for relay to the first mobile peripheral another message containing a command to trigger a light device in the first mobile peripheral to emit a strobing light pattern which can be seen by a passenger transporting the first mobile peripheral and/or by a crew member, to trigger a sound generation device in the first mobile peripheral to generate an alert sound pattern that can be heard by the passenger transporting the first mobile peripheral and/or by a crew member, and/or to trigger a vibrator device in the first mobile peripheral to generate an alert vibration which can be felt by the passenger transporting the first mobile peripheral.

7. The vehicle entertainment system of claim 3, wherein:

for each of the SVDUs, the local controller is operative to reduce transmission power of the RF transceiver responsive to the vehicle transitioning from a vehicle travel state to a vehicle arrival state defined by the loss reporting rule, to decrease a maximum distance that one of the mobile peripherals can be moved away from the RF transceiver without loss of the established communication connection.

8. The vehicle entertainment system of claim 7, wherein:

for each of the SVDUs, the local controller is operative to limit transmission power level of the RF transceiver to more than a first threshold level while the vehicle is in the vehicle travel state, and to limit transmission power level of the RF transceiver to no more than a second threshold level while the vehicle is in the vehicle arrival state, wherein the first threshold level is greater than the second threshold level.

9. The vehicle entertainment system of claim 8, wherein:

wherein the first threshold level is at least twice as great as the second threshold level.

10. The vehicle entertainment system of claim 8, wherein:

for each of the SVDUs, the local controller is operative to determine the first threshold level based on a maximum transmission power level capability of the RF transceiver, and determine the second threshold level based on measuring a minimum transmission power level of the RF transceiver that allows maintaining an established communication connection with a mobile peripheral while remaining located in a seating area serviced by the SVDU, and determining the second threshold level based on a combination of the minimum transmission power level and a defined offset value.

11. The vehicle entertainment system of claim 3, further comprising:

a plurality of seat video display units mounted in seatbacks of passenger seats, each of the seat video display units (SVDUs) comprising a local controller and a radio frequency (RF) transceiver operative to communicate with mobile peripherals within communication range of the RF transceiver, wherein the peripheral manager is operative to:

receive reports from the local controllers of the SVDUs indicating a list of mobile peripherals that are within communication range;

track location of a first mobile peripheral based on which of the SVDUs are reporting that the first mobile peripheral is within communication range and which of the SVDUs are not reporting that the first mobile peripheral is within communication range, and based on a cabin layout of passenger accommodations (LOPA) indicating locations of the SVDUs relative to a vehicle cabin exit; and trigger the sending of the information to the crew terminal and/or the adding of the information to the report responsive to the first mobile peripheral traveling within a threshold distance of the vehicle cabin exit during the vehicle arrival state.

12. The vehicle entertainment system of claim 11, wherein the peripheral manager is further operative to:

send display commands to the crew terminal to dynamically update a graphical representation of the LOPA and the vehicle cabin exit with a graphical indication of the tracked location of the first mobile peripheral in the vehicle.

13. The vehicle entertainment system of claim 11, wherein the peripheral manager is further operative to:

respond to determining that the first mobile peripheral has traveled at least a threshold distance along a passenger egress pathway toward the vehicle cabin exit during the vehicle arrival state without having reached the threshold distance of the vehicle cabin exit, by sending a first level of alert notification to the crew terminal; and respond to determining that the first mobile peripheral has traveled to less than the threshold distance from the vehicle cabin exit, by sending a second level of alert notification to the crew terminal indicating a higher level of urgency than indicated by the first level of alert for stopping removal of the first mobile peripheral by the passenger.

14. The vehicle entertainment system of claim 1, wherein: the peripheral manager is further operative, responsive to determining the vehicle has transitioned to the vehicle arrival state, to:

activate a RF identification (RFID) reader device, which is mounted at a location in a cabin of the vehicle along a passenger egress pathway toward a vehicle cabin exit door;

monitor the RF ID reader device to read data provided by a RF ID tag on the one of the mobile peripherals as it passes within range of the RF ID reader device; and determine based on the data the information identifying the one of the mobile peripherals and/or the passenger associated with the one of the mobile peripherals, for sending to the crew terminal and/or adding to the report for communication to the offboard peripheral manager.

15. The vehicle entertainment system of claim 1, further comprising:

a plurality of seat video display units (SVDUs) mounted to passenger seats, each of the SVDUs comprising a local controller and a wired network connector configured to releasably connect through a wired network cable with a mobile peripheral, wherein the local controller of a first SVDU identifies disconnection of a wired network cable connection to a first mobile peripheral during the vehicle arrival state defined, and responsive thereto communicates to a wireless access point in cabin of the aircraft for relay to the first mobile peripheral another message containing instructions for a passenger to return the first mobile peripheral to a crew member, to a defined location within the vehicle, and/or to a defined location along a passenger ingress pathway of an arrival terminal.

* * * * *